July 8, 1941.　　C. F. HENNEY　　2,248,756
REFRIGERATING APPARATUS
Filed Sept. 13, 1935　　2 Sheets-Sheet 1
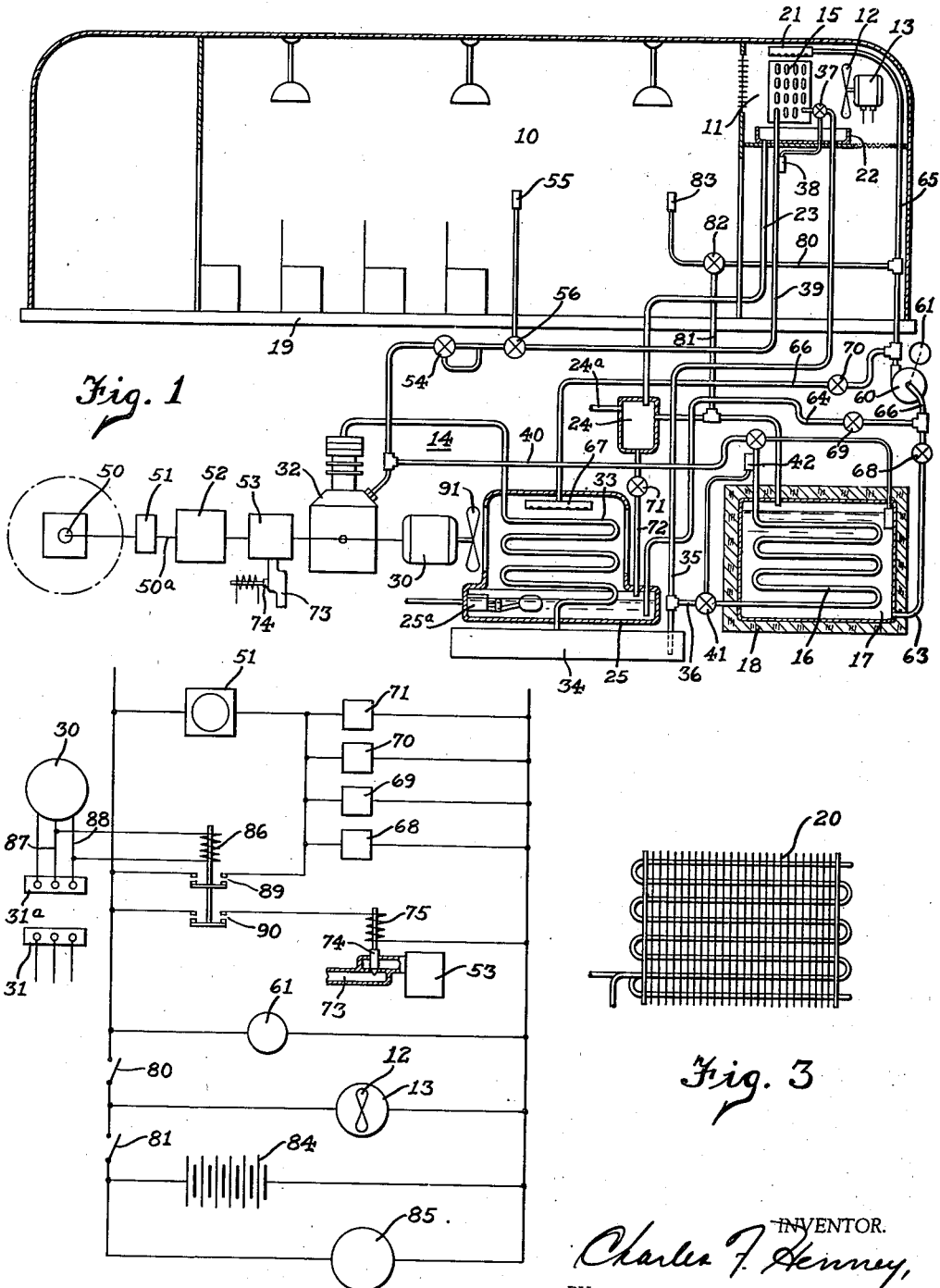

July 8, 1941.  C. F. HENNEY  2,248,756
REFRIGERATING APPARATUS
Filed Sept. 13, 1935  2 Sheets-Sheet 2

INVENTOR.
Charles F. Henney,
BY
ATTORNEYS

Patented July 8, 1941

2,248,756

UNITED STATES PATENT OFFICE 2,248,756

REFRIGERATING APPARATUS

Charles F. Henney, Dayton, Ohio, assignor to General Motors Corporation, Dayton, Ohio, a corporation of Delaware Application September 13, 1935, Serial No. 40,421

9 Claims. (Cl. 62—3)

This invention relates to refrigeration, and more particularly to the conditioning of air for vehicles, such as railway cars or the like.

An object of this invention is to provide an improved air conditioning system for a vehicle such that power for the refrigerating system is made dependent on the operation of the vehicle in such a manner that refrigeration may be provided from a holdover or from standby motor operation while the vehicle is standing.

Further objects and advantages of the present invention will be apparent from the following description, reference being had to the accompanying drawings, wherein a preferred form of the present invention is clearly shown.

In the drawings:

Fig. 1 is a diagrammatic representation of a railway car embodying features of my invention;

Fig. 2 is a wiring diagram of the apparatus shown in Fig. 1;

Fig. 3 is a front view of the evaporator transversely to that shown in Fig. 1;

Figure 4:
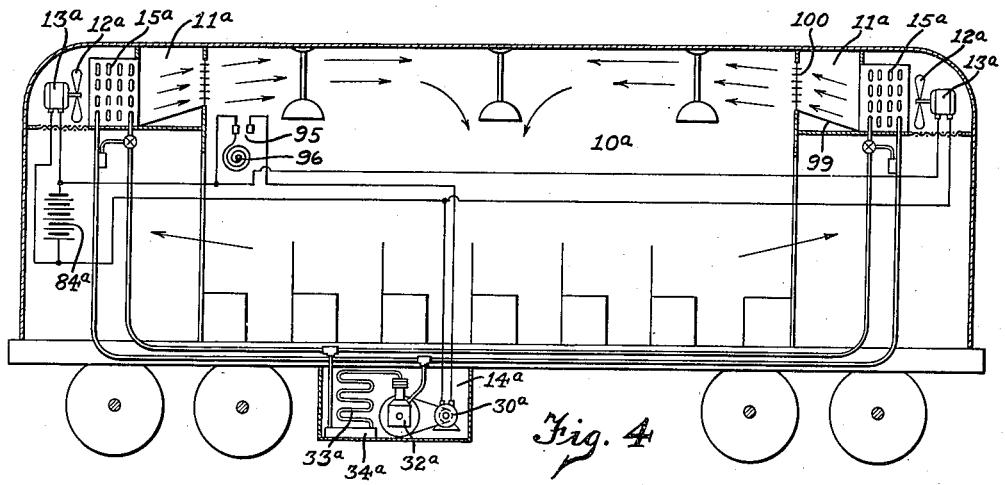
Fig. 4 is a diagrammatic representation of baffle arrangements for distributing air into the compartment.
Figure 5:
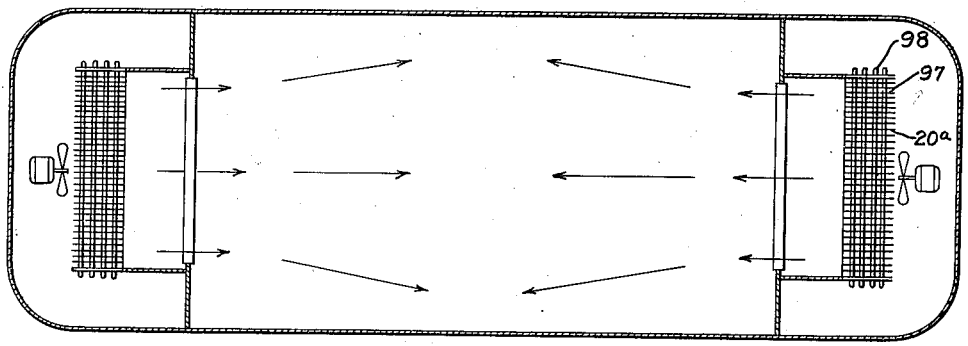
Fig. 5 is a horizontal cross-sectional view of Fig. 4.
Figure 6:
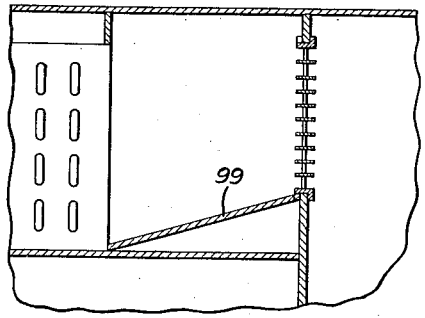
Fig. 6 is an enlarged view of a portion of Fig. 4.
Figure 7:
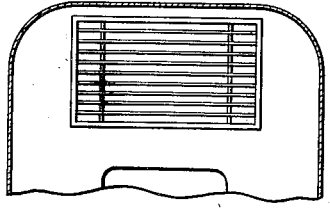
Fig. 7 is a view transversely to Fig. 6.

A vehicle, such as a railway car, embodying features of my invention may be provided with a compartment 10 for which air is to be conditioned. The air for compartment 10 may be caused to flow through an air conditioning compartment 11 by means of a fan 12 driven by motor 13. The air driven by the fan 12 may come from the compartment 10, may be fresh air outside the compartment 10 or vehicle, or may be a mixture of both. A refrigerant liquefying unit 14 is provided and is so arranged that it may be operated while the vehicle is in motion. The liquefying unit 14 is in refrigerant flow relationship with an evaporator 15 which cools the air for the compartment 10 and with an evaporator 16 which is in thermal exchange relationship with holdover 17 in tank 18. The tank 18 conveniently may be carried underneath the floor 19 of the car. All of the apparatus diagrammatically represented below the floor of the car 19 may also be supported under the floor of the car and is carried by the car.

The arrangement is such that the liquefying unit 14 refrigerates the evaporators 15 and 16 while the car is in motion. If desired, the holdover 17 may be circulated from tank 18 to the compartment 11 while the car stands so that the holdover may refrigerate the air. Conveniently this may be accomplished by causing the holdover to be sprayed over the fins 20 of the evaporator 15 by means of a spray head 21. If the holdover is water (although it is to be understood that holdovers such as brine or the like may be used), it may be gathered in a drain pan 22 along with water condensed from the air and may be allowed to drain through the pipe 23 into the sump 24 from whence it may flow either into the holdover tank 18 or into the condenser tank 25 in a manner to be more fully described.

While it is contemplated that the holdover may be circulated from the tank 18 into the air conditioning compartment 11 while the car is standing, it is to be understood that, in lieu thereof, the refrigerant liquefying unit may be driven by an electric motor by electricity at a station if the holdover capacity of the system is insufficient. For this purpose a standby motor 30 may be provided which may be plugged into the station power outlet 31 by plug 31a and is adapted to operate the refrigerant liquefying unit in lieu of the circulation of holdover from the tank 18 to the compartment 11.

The refrigerant liquefying unit preferably comprises a compressor 32 which discharges compressed refrigerant into the condenser 33 from whence condensed refrigerant flows into the receiver 34. A liquid refrigerant pipe 35 connects the receiver with the evaporator 15 and a liquid refrigerant pipe 36 connects to evaporator 16 with the receiver. An automatic expansion valve 37 is provided for the evaporator 15, and, if desired, this valve may be of the thermostatic type under the control of a thermostatic bulb 38 which automatically throttles the valve 37 when the refrigerating effect reaches the bulb 38. The valve 37 is of the type which automatically admits refrigerant into the evaporator 15 when the pressure therein is reduced below a predetermined limit; but which may be throttled by the bulb 38 if the refrigerating effect passes beyond the evaporator 15. The calibration of the valve 37 is such that it automatically feeds liquid refrigerant at a pressure corresponding to a temperature slightly above 32° F. The evaporated refrigerant from the evaporator 15 returns to the compressor 32 through the line 39 and the evaporated refrigerant from the evaporator 16 returns to the compressor through the line 40. The evaporator 16 is provided with an automatic expansion valve 41. This valve may also be of the thermostatic type under the control of a thermostatic bulb 42. The valve 41 and bulb 42 may be similar in construction and function to the valve 37 and bulb 38. However, the calibration of the valve 41 preferably is such that it automatically feeds liquid refrigerant in the evaporator 16 at a temperature below the freezing point of the holdover 17. In case the holdover 17 is water, this temperature is sufficiently below 32° F. to freeze a substantial amount of the holdover.

Automatic controls are provided to insure proper operation of the apparatus under varying conditions. Thus the compressor 32 may be driven from a live axle 50 of the car. The drive, diagrammatically indicated by the line 50a, may be a drive shaft, gear drive, belt drive or a combination or series of any of them. The drive between the live axle and the compressor may be provided with a centrifugal switch 51. This switch preferably is calibrated to close automatically at or above a predetermined car speed or motion condition, remaining closed at all speeds above such predetermined speed or motion condition and opening at all motion conditions (including standing condition) at or below said predetermined speed or motion condition. The drive may also be provided with a variable ratio drive 52 which automatically changes the ratio in response to car speed, so that the speed ratio of the live axle to the compressor decreases as the speed of the car increases. This ratio change may be either a gradual increment or in steps. It may maintain the speed of the compressor substantially constant regardless of varying car speeds, or it may maintain its speed between acceptable limits. The drive 50a also may include a clutch 53 which may be actuated by air pressure or the like in such a manner that it is declutched when air is supplied thereto. The suction line 39 may be provided with an automatic valve 54 which automatically throttles the line when the pressure therein reaches a predetermined low limit. This prevents the compressor from reducing the pressure in the evaporator 15 below a desired limit such as that corresponding to 32° F. Refrigeration supplied by the evaporator 15 may be controlled in accordance with temperatures produced in the apparatus. Thus thermostatic bulb 55 may be placed where it is responsive to temperatures in the compartment 10 and this bulb may control an automatic valve 56 placed in the suction line 39. This valve automatically throttles the line when the temperature in the compartment 10 reaches a predetermined low limit. This valve may be either a snap acting valve or may be of the type which gradually throttles the line. This regulates the amount of refrigeration supplied to the compartment 10 by the evaporator 15 while the compressor operates.

The automatic controls may also cause the holdover to be automatically pumped to the compartment 11 to provide refrigeration while the car is standing. These controls may also regulate or modify the circulation of holdover in accordance with temperature conditions in the compartment 10. Controls may also cause an automatic circulation of water over the condenser 33 while the car is running and while the compressor 32 is being driven by the standby motor 30. This may be accomplished, if desired, by a single pump 60, driven by a motor 61. This pump may have its intake 62 connected to the holdover tank 18 by means of the pipe 63 and to the condenser tank 25 by means of the pipe 64. The discharge of the pump 60 may be connected by the pipe 65 with the distributor head 21 over the evaporator 15 and by the pipe 66 with the distributor head 67 over the condenser 33. Solenoid valves 68, 69, 70 and 71 may be placed, respectively, in the pipes 63, 64, 66 and in pipe 72 which connects the sump 24 with the condenser tank 25. In addition, the air line 73, which leads to the clutch 53, may be provided with a valve 74 controlled by the solenoid 75. When the car is operating at a speed above the selected predetermined limit, the centrifugal switch 51 is closed and this automatically energizes the solenoid valves 68, 69, 70 and 71. As the manual switches 80 and 81 are in closed positions when refrigeration is desired, the motor 61 of the pump 60 is in operation at all times when refrigeration is desired. When the switch 51 is closed, and the solenoid valves 68, 69, 70 and 71 are energized water is circulated from the tank 25 to the sprayhead 67. When the centrifugal switch 51 is opened by the reduction of speed or the stopping of the car, the solenoid valves 68, 69, 70 and 71 are de-energized and the holdover 17 from the tank 18 is circulated to the spray-head 21 and over the fins of the evaporator to cool the air for the compartment 10. This is accomplished because solenoid valves 69, 70 and 71 open while the car is running and while their solenoids are energized, whereas solenoid valve 68 is closed when the car is running and while its solenoid is energized, the converse occurring when the solenoids are de-energized.

The flow of holdover from the tank 18 to the air conditioning compartment may be controlled or modified in accordance with temperature conditions such as in compartment 10. This may be accomplished by providing a by-pass 80, 81 between the discharge of the pump 60 and the holdover tank 18. A valve 82, controlled by thermostatic bulb 83, automatically opens the by-pass when the temperature in the compartment 10 has been reduced to a predetermined limit. This prevents or reduces the pumping of holdover to the air conditioning compartment 11 as long as the temperature in the compartment 10 is sufficiently low but permits or increases such pumping when the temperature in the compartment is above the selected limit.

Electrical energy for the controls may be provided from the battery 84 and generator 85, which are usually carried on railway cars, as indicated in Fig. 2. The arrangement preferably also is such that these controls continue to function when the motor 30 is plugged into the station power line 31 at a station. This may be accomplished by providing a solenoid 86 across the lines 87 and 88 of the leads to the motor 30. When the motor 30 is plugged into the station current, and the solenoid 86 is thereby energized, the contacts 89 and 90 are closed. This automatically energizes the solenoid valves 68, 69, 70 and 71, causing water to be pumped from the tank 25 over the condenser 33; and causes the solenoid 75 to be energized thus permitting air (from the air brake system or the like) to flow to the pneumatic clutch 53 and cause it to declutch the compressor 32 from the live axle 50. This permits the motor 30 to drive the compressor 32 while the car is standing without interference from the live axle.

If desired, a fan or blower 91 may be placed in such a position as to blow air over the condenser 33 while the compressor 32 operates either from the live axle or the motor or both. The tank 25 may be supplied with make-up water by the float controlled valve 25a which may be connected to any convenient water supply on the car. The sump 24 is of such size that it permits slight fluctuations in the volume of water in the system; but overflows through pipe 24a when the volume of water is increased unduly by the condensation of water.

While I have shown the condenser water circulation system connected to the holdover system, it may be omitted altogether or may be made independent thereof by providing a separate pump and water flow connections. Such pump may be driven from the compressor shaft or the like.

Figure 8:
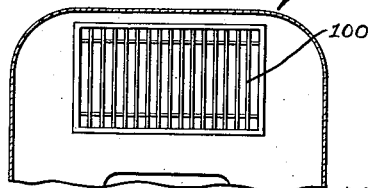
Fig. 8 is a modification of a device shown in Figs. 6 and 7.

The arrangement shown in Figs. 4 to 7 inclusive may be used with the water circulation features shown in Fig. 1, but such showing has been omitted in Fig. 4 to simplify the disclosure. The compartment 10a may be supplied with conditioned air passing through the air conditioning compartments 11a. These compartments are provided with evaporators 15a, and air is circulated by means of fans 12a, the air coming either from the compartment 10a or from outside the car or both. The evaporators 15a are connected to a refrigerant liquefying unit 14a which may include a compressor 32a, motor 30a, condenser 33a and receiver 34a. The motor 30a may receive its current either from a battery 84a or from the station current or both. The operation of the motor 30a is made dependent on the opening and closing of the contacts 95 of the thermostat 96. The motors 13a may be driven continuously by current derived from the battery 84a. The evaporators 15a as well as the evaporator 15, preferably are of the type which is provided with horizontal runs 97 of pipe connected by bends 98 to form continuous and sinuous refrigerant flow passages. The horizontal runs are joined by vertical fins 20 and 20a. The fins are continuous throughout the heighth of the evaporator so that water may flow over their surfaces without being blown or carried along by the air stream. A slanting baffle 99 is placed in front of the evaporators to give the cooled air a slightly upward direction before being discharged through the louvres 100 placed at the discharge of the compartment 11 or 11a. This prevents downward drafts of cooled air on the passengers. Louvres 100 may be either horizontally placed as shown in Figs. 4 to 7 inclusive or may be vertically placed as indicated in Fig. 8.

While the form of embodiment of the invention as herein disclosed, constitutes a preferred form, it is to be understood that other forms might be adopted, all coming within the scope of the claims which follow.

What is claimed is as follows:

1. In a vehicle, a live axle, a standby motor, a refrigerant liquefying unit, means for selectively operating said unit by said live axle or said motor, a first named evaporator in refrigerant flow relationship with said unit and in thermal exchange relationship with air to be conditioned for said vehicle, a holdover tank, means for circulating holdover from said tank over said evaporator, a second named evaporator in refrigerant flow relationship with said unit and in thermal exchange relationship with holdover in said tank, and means automatically controlling the circulation of said holdover over said first named evaporator.

2. In a vehicle, a live axle, a standby motor, a refrigerant liquefying unit, means for selectively operating said unit by said live axle or said motor, a first named evaporator in refrigerant flow relationship with said unit and in thermal exchange relationship with air to be conditioned for said vehicle, a holdover tank, means for circulating holdover from said tank over said evaporator, a second named evaporator in refrigerant flow relationship with said unit and in thermal exchange relationship with holdover in said tank, and means automatically controlling the circulation of said holdover over said first named evaporator, said last named means causing circulation of holdover over said first named evaporator while said refrigerant liquefying unit is idle.

3. In a vehicle, a live axle, a standby motor, a refrigerant liquefying unit, means for selectively operating said unit by said live axle or said motor, a first named evaporator in refrigerant flow relationship with said unit and in thermal exchange relationship with air to be conditioned for said vehicle, a holdover tank, means for circulating holdover from said tank over said evaporator, a second named evaporator in refrigerant flow relationship with said unit and in thermal exchange relationship with holdover in said tank, and means automatically controlling the circulation of said holdover over said first named evaporator, said last named means causing circulation of holdover over said first named evaporator while said refrigerant liquefying unit is idle, and having a thermostatic control to modify said circulation in accordance with temperature conditions.

4. In a vehicle, a live axle, a refrigerant liquefying unit operatively connected to said axle, a first named evaporator in refrigerant flow relationship with said unit and in thermal exchange relationship with air to be conditioned, a holdover tank, a second named evaporator in refrigerant flow relationship with said unit and in thermal exchange relationship with holdover in said tank, and means for circulating holdover from said tank over said first named evaporator.

5. In a vehicle, a live axle, a refrigerant liquefying unit operatively connected to said axle, a first named evaporator in refrigerant flow relationship with said unit and in thermal exchange relationship with air to be conditioned, a holdover tank, a second named evaporator in refrigerant flow relationship with said unit and in thermal exchange relationship with holdover in said tank, means for circulating holdover from said tank over said first named evaporator, and means automatically causing circulation of said holdover over said first named evaporator while motion conditions of said vehicle are above a predetermined limit and stopping said circulation while said motion conditions are below said limit.

6. In a vehicle, a live axle, a refrigerant liquefying unit operatively connected to said axle, a first named evaporator in refrigerant flow relationship with said unit and in thermal exchange relationship with air to be conditioned, a holdover tank, a second named evaporator in refrigerant flow relationship with said unit and in thermal exchange relationship with holdover in said tank, means for circulating holdover from said tank over said first named evaporator, and means modifying circulation of said holdover over said evaporator in accordance with temperature conditions.

7. In a vehicle, a live axle, a refrigerant liquefying unit operatively connected to said axle, a first named evaporator in refrigerant flow relationship with said unit and in thermal exchange relationship with air to be conditioned, a holdover tank, a second named evaporator in refrigerant flow relationship with said unit and in thermal exchange relationship with holdover in said tank, means for circulating holdover from said tank over said first named evaporator, means automatically causing circulation of said holdover over said first named evaporator while motion conditions of said vehicle are above a predetermined limit and stopping said circulation while said motion conditions are below said limit, and means modifying circulation of said holdover over said evaporator in accordance with temperature conditions.

8. In a vehicle, a live axle, a refrigerant liquefying unit, a clutch drive between said axle and unit, a standby motor, a drive connection between said motor and unit, means automatically declutching said clutch drive while said motor is energized, a first named evaporator in refrigerant flow relationship with said unit and in thermal contact with air to be conditioned, a second named evaporator in refrigerant flow relationship with said unit and in thermal contact with a holdover, and means automatically circulating holdover over said first named evaporator while motion conditions of said vehicle are below a predetermined limit and while said motor is deenergized and automatically stopping said circulation while said motion conditions are above said predetermined limit and while said motor is energized.

9. In combination, a refrigerant liquefying unit, a first named evaporator in refrigerant flow relationship with said unit and in thermal exchange relationship with a medium to be conditioned, a holdover tank, means for circulating holdover from said tank over said evaporator, a second named evaporator in refrigerant flow relationship with said unit and in thermal exchange relationship with holdover in said tank, and means automatically controlling the circulation of said holdover over said first named evaporator.

CHARLES F. HENNEY.